Feb. 28, 1967   W. S. WARREN ETAL   3,306,380
CORE DRILL
Filed Jan. 27, 1964   2 Sheets-Sheet 2
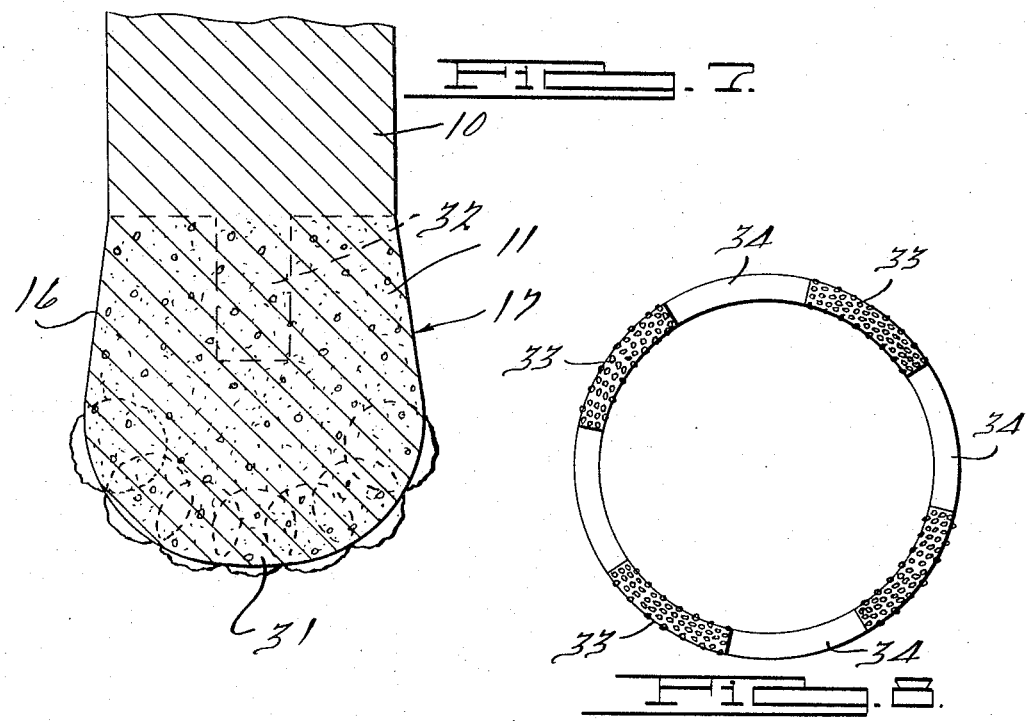
FIG. 7.
FIG. 8.
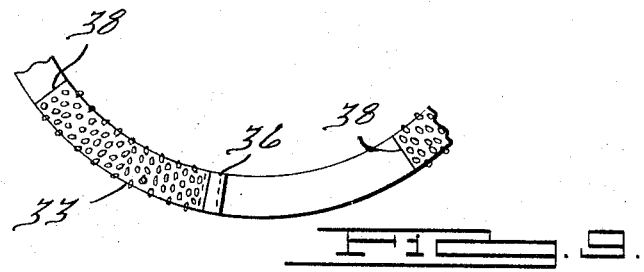
FIG. 9.
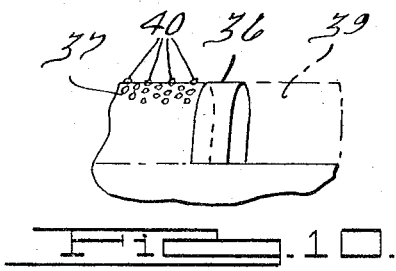
FIG. 10.
INVENTORS.
Wesley S. Warren
Ertman L. Kessler
BY
Carness, Dickey & Pierce
ATTORNEYS

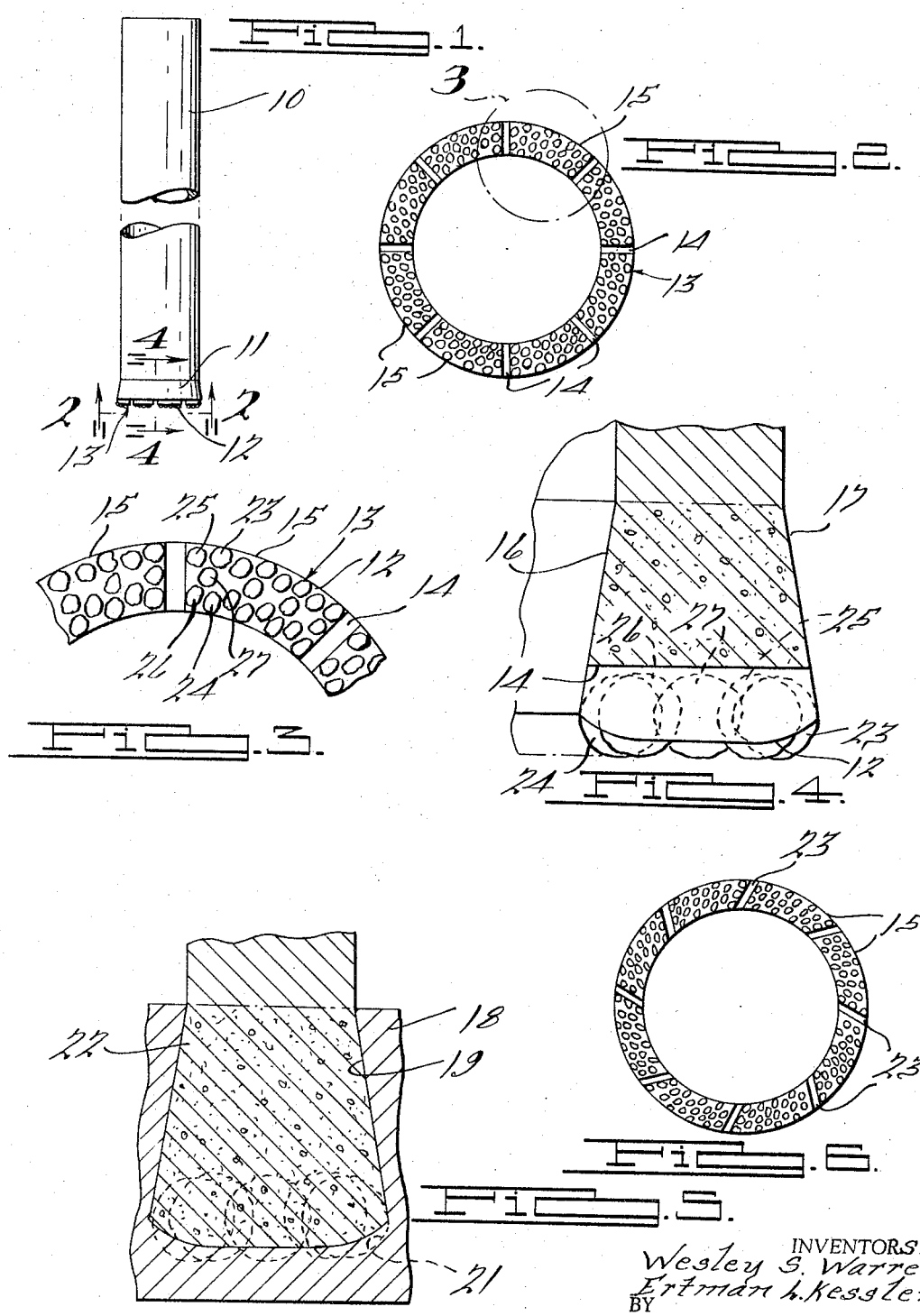

3,306,380
CORE DRILL

Wesley S. Warren, Kalamazoo, and Ertman L. Kessler, Plymouth, Mich., assignors to General Automation Manufacturing, Incorporated, Troy, Mich., a corporation of Michigan
Filed Jan. 27, 1964, Ser. No. 340,272
4 Claims. (Cl. 175—330)

This invention relates to diamond core drills and particularly to a diamond core drill having precisely oriented diamonds on the end face which is relieved rearwardly thereof.

Heretofore core drills have been made with rows of diamonds on the end face and on the side walls rearwardly of the face. The rows of diamonds on the side walls provided relief, were difficult to position and added substantially to the tool cost.

The present invention pertains to the use of oriented rows of diamonds on the arcuate end face only of the tool, the relief at the side walls being obtained by converging the walls rearwardly of the end face. The inner and outer row of diamonds extended to the edges of the end face of the tool and a second row was nested between the diamonds of the edge rows slightly inward of the edges to be available to take the place of the diamonds in the edge rows in case they should be broken or pulled from the supporting material. With this arrangement it was found that the rate of cutting of the tool and its life was substantially increased and the cost of manufacture reduced.

Accordingly, the main objects of the invention are: to apply diamonds on the end face only of a core drill and relieve the walls rearwardly thereof to provide clearance; to orient rows of diamonds on the arcuate end face of a core drill by offsetting the edge rows slightly relative to each other to have the offset rows available to take the place of the edge rows in case the diamonds in the latter become damaged or destroyed; to apply a row of diamonds to the end face of a tool in sections which are separated by slots which are disposed angularly to radial lines to produce a pumping action and reduce shock to the diamonds which occurs when the slots were disposed radially; and in general to provide a diamond core drill which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein:

FIGURE 1 is a broken view in elevation of a core drill having diamonds in the end face thereof disposed in the manner embodying the features of the present invention;

FIG. 2 is an enlarged end view of the structure illustrated in FIGURE 1;

FIG. 3 is an enlarged broken view of the structure illustrated in FIG. 2 as viewed within the circle 3 thereof;

FIG. 4 is an enlarged broken sectional view of the structure illustrated in FIGURE 1 taken on the line 4—4 thereof;

FIG. 5 is a view of structure, similar to that illustrated in FIG. 4, showing a method used for constructing the core drill;

FIG. 6 is a view of structure, similar to that illustrated in FIG. 2, showing another form thereof;

FIG. 7 is a view of structure, similar to that illustrated in FIG. 4, showing a further form which the invention may assume;

FIG. 8 is a view of structure, similar to that illustrated in FIG. 6, showing the increase in slot width;

FIG. 9 is a large broken view of structure, similar to that illustrated in FIG. 8, showing a further form which the invention may assume; and FIG. 10 is an enlarged view of structure, similar to that illustrated in FIG. 9, showing a further form of the invention.

Referring to the figures, a tubular driving shank 10 has a relieved head 11 provided with a face 12 containing a plurality of rows of diamonds 13. Chip clearance slots 14 are radially disposed in the end face 12 dividing it into sections 15. Several advancements in the art have made the core drill a complete success. One is having the head 11 formed with sloping sides 16 and 17 to provide relief for the face 12 and the diamonds retained thereby. Another is that of orientating the diamonds in rows in each of the sections 15 and a third is having the chip clearance slots disposed at an angle to radii across the face.

The tool is constructed by employing a carbon blank 18, as illustrated in FIG. 5, having an annular diverging slot 19 cut therein with the bottom of the slot provided with drilled apertures 21 which are oriented in areas conforming to the sections 15. Each diamond 13 is placed within an aperture 21 with the desired cutting edge in the bottom of the aperture after which a powder 22, which is a mixture that sinters when heated and wets and secures the diamonds firmly therein. Such powders are procurable in the trade over a range of hardnesses which may be selected. After the annular slot 19 has been packed with the powder, the end of the driving shank 10 is placed thereon in extension thereof. The assembly is then placed in an oven and heated to a temperature which sinters the powder 22 and wets and secures the diamonds when forcing the head 11 which is bonded to the end of the shank 10 in the single operation. Thereafter the carbon blank 18 is broken away from the head 11 and the slots 14 are cut through the face 12 of the head in a conventional manner.

Each of the sections 15 have the diamonds in the rows 23, 24, 25, 26 and 27 extending outwardly from the face 12 of the tool. The rows 23 and 24 extend to the outer and inner edges of the head while the rows 25 and 26 are offset slightly from the edges when located between the diamonds of the rows 23 and 24. The fifth row of diamonds 27 are disposed on the arcuate center line of each section 15 substantially radially aligned with the diamonds in the rows 23 and 24. When the diamonds in the rows 23 and 24 become dull, chipped or broken along with the supporting matrix, the diamonds in the rows 25 and 26 are available to do the cutting along the inner and outer edges of the end face. By sloping the sides 16 and 17 of the head relief is provided for the face, the rows of diamonds along the sides are eliminated and the chips are readily washed from the annular aperture being cut by the core drill.

In FIG. 5, it will be noted that the chip clearance slots 23 are cut through the face 12 at an angle to radii extending therethrough. The slot edges are offset from a parallel approach over the bottom of the annular hole being drilled to produce an impeller action and better circulation of the water and to reduce shock at the leading and trailing edges of the slot. The angularly disposed edges of the slots will bridge a hard spot encountered rather than strike it directly as would occur when the slots are disposed radially.

In FIG. 7, a further form of the invention is illustrated that wherein the relieved head 11 has the working end 31 of arcuate shape blending into the converging sides 16 and 17 which blend into the surfaces of the shank 10.

The rows of diamonds follow the arcuate shape of the head and thereby provide side relief from the center outwardly to produce a faster cutting operation than that produced by the somewhat flattened end illustrated in the embodiment of FIG. 4. The tubular shank 10 is illustrated as being provided with a central flange 32 to obtain a more secure bond with the powder material of the head 11. Otherwise, the structure of the head follows that hereinabove described with regard to FIGS. 1 to 6.

During the operation of the drill, pressure must be applied downwardly thereon. When a self-contained driving device is employed, suction cups are provided thereon for securing the device in fixed position so that a pressure of approximately 1500 pounds can be applied downwardly on the drill while being driven by a motor having a horsepower rating of from 2 to 4 horsepower. When the driving device is part of a truck, greater pressure may be applied to the drill up to 15,000 pounds, and a heavier motor in the range from 20 to 40 horsepower can be employed.

When using the self-contained driving device with a drill having diamonds applied to the end as herein described, a cutting rate of substantially 9 inches in 8 minutes of drilling time will be obtained. With the greater horsepower and pressure employed when the drill is operated from a device on a truck, a 9 inch core can be cut in approximately 2 minutes. It was found further that for this speed of drilling, 9 carats of diamonds should be employed in approximately 3 square inches of cutting face for the self-contained driving device and for the device attached to a truck approximately 14 carats of diamonds should be employed in 3 square inches of cutting face. When tools are to be provided having greater diameters, the same concentration of diamonds per square inch of area is maintained by increasing the length of the slots 14 without substantially increasing the thickness of the diamond sections therebetween. Such an arrangement is illustrated in FIG. 8 where the four sections 33 containing the diamonds are so spaced by the slots 34 as to provide 3 square inches of cutting face.

The drill will have the same concentration of diamonds per square inch of area for the horsepower and pressure which is applied thereto during the drilling operation. With this arrangement the rate of cut will be substantially constant but the drilling time will increase with the increased diameter of the drill.

The following formula can be used for a circle to be cut by a drill having a diamond concentration corresponding to the power and pressure which will be available for driving the drill:

$$\frac{3.1416\ DW - A}{N} = \frac{T}{W} = L$$

$D$ = Diameter of tool in inches
$W$ = Width of diamond wall in inches
$A$ = Area of diamond concentration in square inches
$N$ = Number of slots
$T$ = Area of each slot
$L$ = Length of each slot in inches From this formula the length of the cutting diamond sections and that of the spaces therebetween will be obtained. As illustrated in FIG. 8 the sections 32 separated by the slots 34 provide a predetermined area of concentrated diamonds which produces the fastest cutting for the power and pressure which is employed for driving the drill. In this arrangement it will be noted that the end faces 35 of each of the sections 33 are radially disposed.

In FIG. 9 a further form of the invention is illustrated that wherein the forward face of each section 32 is provided with a cutting blade 36 which conforms to the shape of the hardened body 37 formed of the powder 22 with the rows of diamonds extending thereabove. In FIG. 10 the cutting blade 36 is shown sloping forwardly to provide relief to the forward cutting edge of the blade which is made of hard material, such as tungsten carbide or the like. The blades 36 at the advancing edge of the sections 33 maintains the speed of cut when reinforcing bars in the cement must be severed by the core drill. The diamonds will be sufficiently embedded within the concrete to have the cutting edge of the blades 36 engage the bars and take cuts therefrom thereby relieving the diamonds and maintaining the drilling speed. In the example illustrated in FIG. 10, it will be noted that the area of the slot 34 between the cutting blade 36 and the face 38 in the slot 19 of the carbon blank 18 is filled with an inert material 39 which is broken from the slots 34 when the carbon blank is destroyed.

By employing an arcuate working face 31 of the diamond at the end of the head 11 and by using a proper concentration of diamonds on the face, a maximum cutting rate is produced for the drill. The concentration of diamonds and the number of square inches of diamond area has been empirically selected for the amount of power and pressure which is available to operate the drill. The cutting area is maintained as the drill diameter increases by lengthening the slots between the cutting sections. By employing a cutting blade at the forward end of the sections, relief is provided to the diamonds when reinforcing bars are encountered during the drilling operation and the speed of the drilling is substantially maintained. With this arrangement, the maximum speed of cut for the power and pressure available in the driving device is maintained even though reinforcing bars are encountered during the core drilling operation. The blade 36 may slope toward the matrix at the top to provide a negative rake to the cutting edge so as to be capable of withstanding greater shock. It will be noted in FIG. 7 that several rows of diamonds are employed to cover the cutting area, the rows changing in number to conform to the shape and width of the matrix. As illustrated in FIG. 10, the central row 40 may be lengths of tungsten carbide of from $\frac{1}{16}''$ to $\frac{3}{32}''$ in diameter, spaced about one inch apart and employed to take the shock of contacting the cement to relieve the sharp points of the diamonds therefrom. The tungsten carbide or like material will wear faster than the diamonds and will not interfere with the rate of cutting by the diamonds.

What is claimed is:

1. In a core drill, a cylindrical driving shank, a head on the end of the driving shank having a substantially semi-cylindrical end face, side walls converging to the shank from positions tangent to opposite ends of the face, and rows of diamonds in the face of the head substantially to said sloping side walls so as to extend therebeyond and cut beyond the side walls, the concentration of diamonds being substantially constant, said head having slots therethrough dividing the cutting face into sections, and a cutting blade at the advancing end of at least one of the sections in abutting relation therewith and with a contour substantially that of the engaged section.

2. In a core drill, a cylindrical driving shank, a head on the end of the driving shank having a substantially semi-cylindrical end face, side walls tapering to the shank from positions tangent to opposite ends of the face, and rows of diamonds in the face of the head substantially to said sloping side walls so as to extend and cut therebeyond, the concentration of diamonds being substantially constant, said head having slots therethrough dividing the cutting face into sections, and metal projections in the end face of the head extending outwardly thereof to relieve the diamonds of the full shock of engagement with the concrete.

3. In a core drill, a cylindrical tubular driving shank, a tubular head on the end of the driving shank, said head in radial section having an arcuate convex end face and straight sloping sides which are substantially tangent to said end face and tapering toward each other from the point of tangency with said end face to the point of engagement with said shank, and rows of diamonds in the arcuate end face of the head to substantially the point of tangency of said sloping sides.

4. In a core drill as recited in claim 3, wherein the diamonds are provided in circular rows concentric to the center of the drill with those in one row nested between those in an adjacent row and with the outer rows adjacent to the sloping sides extending therebeyond.

References Cited by the Examiner

UNITED STATES PATENTS

| | | |
|---|---|---|
| 501,915 | 7/1893 | Bullock. |
| 1,488,912 | 4/1924 | Foerster. |
| 2,147,843 | 2/1939 | Jamar. |
| 2,304,482 | 12/1942 | Simons _____ 175—330 |
| 2,326,908 | 8/1943 | Williams _____ 125—20 |
| 2,490,512 | 12/1949 | Deely _____ 175—330 |

FOREIGN PATENTS

| | | |
|---|---|---|
| 952,884 | 11/1956 | Germany. |
| 937,940 | 9/1963 | Great Britain. |
| 52,174 | 3/1942 | Netherlands. |

HAROLD D. WHITEHEAD, *Primary Examiner.*